(12) United States Patent
Kovach et al.

(10) Patent No.: US 8,517,131 B2
(45) Date of Patent: Aug. 27, 2013

(54) BATTERY MOUNTING ASSEMBLY

(75) Inventors: Steven Kovach, Dublin, OH (US); Eric Boettcher, Columbus, OH (US); Nicky Thomas Strock, II, Dublin, OH (US); Robb L. Augustine, Dublin, OH (US)

(73) Assignee: Honda Motor Co., Ltd., Tokyo (JP)

( * ) Notice: Subject to any disclaimer, the term of this patent is extended or adjusted under 35 U.S.C. 154(b) by 490 days.

(21) Appl. No.: 12/842,573

(22) Filed: Jul. 23, 2010

(65) Prior Publication Data

US 2012/0018237 A1  Jan. 26, 2012

(51) Int. Cl.
*B60R 16/04* (2006.01)

(52) U.S. Cl.
USPC .......................................... 180/68.5

(58) Field of Classification Search
USPC ............. 180/68.5, 65.31, 312, 274; 224/400; 429/96, 99, 100; 248/503; 312/293.3, 257.1, 312/265.6, 270.3, 223.1, 350
See application file for complete search history.

(56) References Cited

U.S. PATENT DOCUMENTS

| | | | | |
|---|---|---|---|---|
| 541,864 A * | 7/1895 | Loomis | | 248/224.61 |
| 1,602,520 A * | 10/1926 | Ward | | 180/68.5 |
| 1,862,714 A | 6/1932 | Snow | | |
| 1,994,451 A | 3/1935 | Christenson | | |
| 2,170,325 A | 8/1939 | Harrison | | |
| 2,181,406 A * | 11/1939 | Madden | | 104/91 |
| 2,360,056 A * | 10/1944 | Heitshu | | 180/68.5 |
| 2,676,863 A * | 4/1954 | Cooper | | 312/246 |
| 2,839,349 A * | 6/1958 | Culver | | 312/323 |
| 3,003,573 A * | 10/1961 | Lorenz | | 180/68.5 |
| 3,477,538 A * | 11/1969 | Hall et al. | | 180/65.1 |
| 3,557,895 A * | 1/1971 | Thomas | | 180/68.5 |
| 3,708,028 A * | 1/1973 | Hafer | | 180/65.1 |
| 3,989,118 A * | 11/1976 | Hansen | | 180/68.5 |
| 3,993,378 A * | 11/1976 | Berkus | | 312/293.3 |
| 4,058,182 A | 11/1977 | Huber | | |
| 4,314,734 A * | 2/1982 | Grunert | | 312/322 |
| 4,368,455 A * | 1/1983 | Menard | | 340/431 |
| 4,441,771 A * | 4/1984 | Roesler | | 312/322 |
| 4,779,692 A * | 10/1988 | Hagarty et al. | | 180/68.5 |
| 4,854,540 A * | 8/1989 | Balek | | 248/503 |
| 4,967,864 A * | 11/1990 | Boyer et al. | | 180/65.1 |
| D321,856 S * | 11/1991 | Whitley et al. | | D13/119 |
| 5,189,573 A * | 2/1993 | Klos-Hein et al. | | 360/85 |
| 5,301,765 A * | 4/1994 | Swanson | | 180/68.5 |
| 5,306,077 A * | 4/1994 | Trevaskis | | 312/122 |
| 5,373,910 A * | 12/1994 | Nixon | | 180/65.1 |
| 5,542,488 A * | 8/1996 | Nixon | | 180/65.1 |
| 5,585,205 A * | 12/1996 | Kohchi | | 429/99 |
| 5,760,569 A * | 6/1998 | Chase, Jr. | | 320/104 |
| 5,806,948 A * | 9/1998 | Rowan et al. | | 312/293.3 |
| 5,918,692 A | 7/1999 | Sekita et al. | | |

(Continued)

FOREIGN PATENT DOCUMENTS

JP          200745281          2/2007

*Primary Examiner* — Katy M Ebner
*Assistant Examiner* — Brodie Follman
(74) *Attorney, Agent, or Firm* — Rankin, Hill & Clark LLP

(57) ABSTRACT

A battery mounting assembly for a vehicle includes a battery tray configured to carry an associated vehicle battery and a battery tray support structure mounted to an underside of the vehicle. The battery tray is slidably mounted to the battery tray support structure for movement between a first operational position and a second maintenance position. The second maintenance position is laterally spaced apart from and below the first operational position.

18 Claims, 5 Drawing Sheets

(56) References Cited

U.S. PATENT DOCUMENTS

Figure 1:
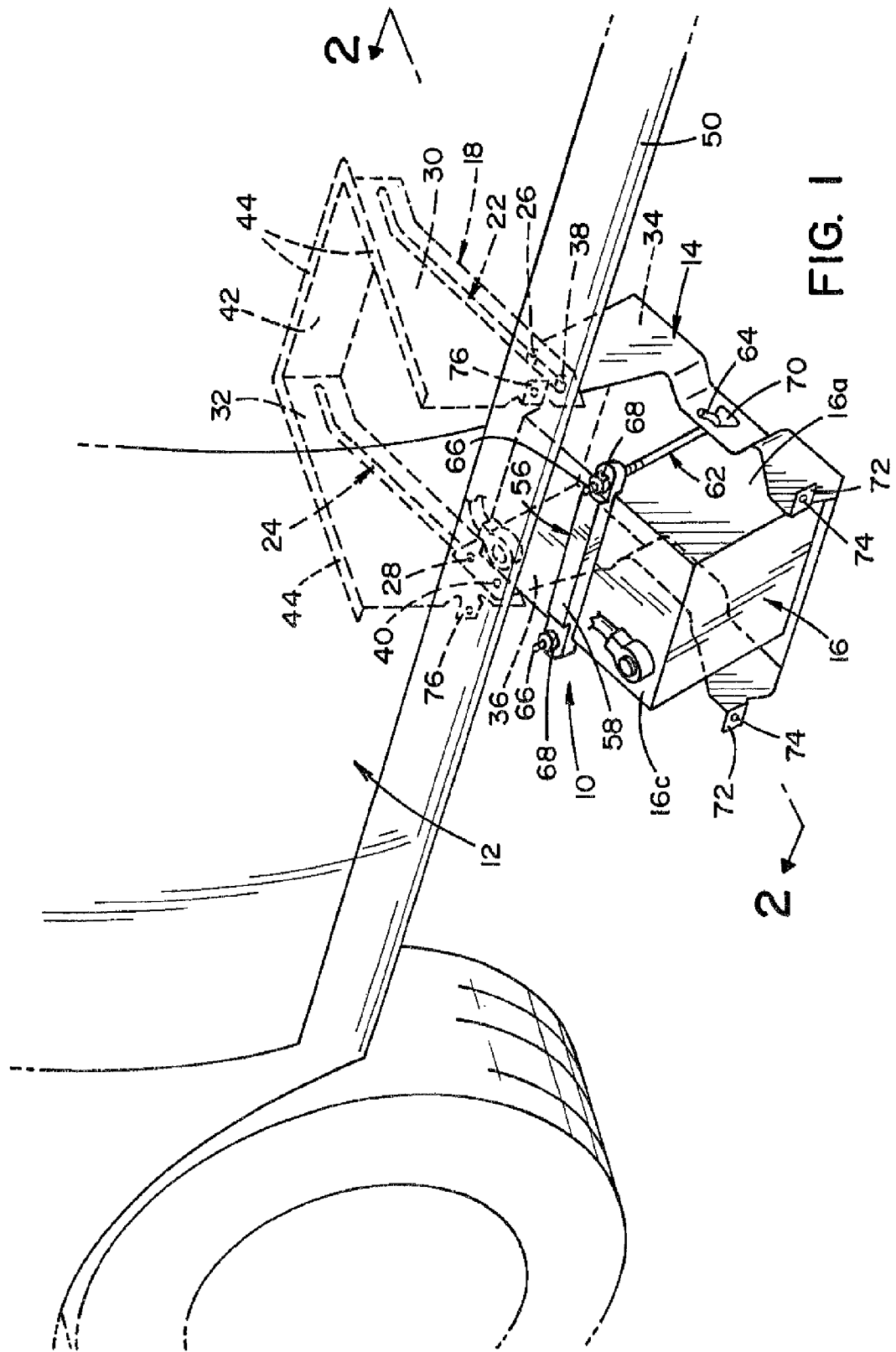

| | | | |
|---|---|---|---|
| 6,227,957 B1 * | 5/2001 | Legatt et al. | 451/350 |
| 6,499,609 B2 * | 12/2002 | Patriche et al. | 211/175 |
| 6,631,775 B1 * | 10/2003 | Chaney | 180/68.5 |
| 6,648,090 B2 * | 11/2003 | Iwase | 180/68.5 |
| 6,871,829 B2 * | 3/2005 | Shannon, Jr. | 248/505 |
| 6,938,553 B2 * | 9/2005 | Tamaki et al. | 104/34 |
| 7,086,492 B2 | 8/2006 | Kawasaki et al. | |
| 7,140,703 B1 * | 11/2006 | Holdgate et al. | 312/323 |
| 7,201,384 B2 * | 4/2007 | Chaney | 180/68.5 |
| 7,312,990 B2 * | 12/2007 | Mangold | 361/695 |
| 7,398,849 B2 * | 7/2008 | Yoshida | 180/68.5 |
| 7,520,355 B2 * | 4/2009 | Chaney | 180/68.5 |
| 7,543,666 B2 * | 6/2009 | Connelly et al. | 180/68.5 |
| 7,712,563 B2 * | 5/2010 | Niebuhr | 180/68.5 |
| 7,828,099 B2 * | 11/2010 | Heckeroth | 180/68.5 |
| 8,146,694 B2 * | 4/2012 | Hamidi | 180/68.5 |
| 8,191,688 B2 * | 6/2012 | Bogelein et al. | 187/222 |
| 8,276,698 B2 * | 10/2012 | Guss et al. | 180/68.5 |
| 8,376,076 B2 * | 2/2013 | Kataoka et al. | 180/68.5 |
| 2001/0013437 A1 * | 8/2001 | Husted et al. | 180/65.1 |
| 2004/0035617 A1 * | 2/2004 | Chaney | 180/65.1 |
| 2004/0124753 A1 * | 7/2004 | Stoller et al. | 312/334.44 |
| 2004/0157117 A1 * | 8/2004 | Tamaki et al. | 429/99 |
| 2005/0117316 A1 * | 6/2005 | Wrycraft | 361/802 |
| 2005/0274556 A1 * | 12/2005 | Chaney | 180/68.5 |
| 2006/0237208 A1 * | 10/2006 | Mangold | 174/50 |
| 2006/0289224 A1 | 12/2006 | Ono et al. | |
| 2008/0006459 A1 * | 1/2008 | Niebuhr | 180/68.5 |
| 2008/0093236 A1 * | 4/2008 | Connelly et al. | 206/308.1 |
| 2009/0242298 A1 * | 10/2009 | Guss et al. | 180/68.5 |
| 2010/0096344 A1 * | 4/2010 | Vanderhoek et al. | 211/49.1 |
| 2011/0090637 A1 * | 4/2011 | Hiyama | 361/679.33 |
| 2011/0133506 A1 * | 6/2011 | Woo | 296/37.8 |
| 2011/0234070 A1 * | 9/2011 | Kataoka et al. | 312/319.1 |
| 2012/0160585 A1 * | 6/2012 | Mildner | 180/68.5 |
| 2012/0175177 A1 * | 7/2012 | Lee et al. | 180/68.5 |

* cited by examiner pins 26 and 38 can both be received in the flat section 22a of slot 22 when the battery tray 14 is in the first operational position (shown in FIG. 3) and can be spaced apart from the relatively flat section 22a and received in the sloped section 22b toward a distal end 22c (relative to the flat section 22a) when the battery tray 14 is in the second maintenance position (shown in FIGS. 1 and 2). By this arrangement, the pair of spaced apart guide pins 26, 38 are both received in the relatively flat section 22a when the battery tray is in the first operational position to orient a base wall 46 of the battery tray 14 in generally parallel relation with at least one of ground G (FIG. 2) and the underside 20 of the vehicle 12. When the pins 26 and 38 are received adjacent the distal end 22c of the slot 22, such as when the battery tray 14 is in the second maintenance position, the base wall 46 of the battery tray 14 is oriented at an angle (e.g., 30°) relative to at least one of ground G and the underside 20 of the vehicle which allows for easier removal of the battery 16 from the battery tray 14.

For mounting the battery assembly, the support structure 18 includes the mounting flanges 44. These flanges 44 are defined along an upper portion of the support structure 18 for mounting the support structure 18 to the underside 20 of the vehicle 12. In one example, the flanged edges 44 provided at the upper ends of the walls 30, 32, 42 of the support structure 18 are welded to an underside component of the vehicle 12, such as floor board member 48, which forms the underside 20 of the vehicle 12. In particular, the battery mounting assembly 10 can be mounted laterally under the vehicle 12 slightly spaced apart from the vehicle's side sill member 50. Alternatively, other mounting arrangements can be used (e.g., threaded fasteners, such as bolts, rivets, etc.).

Figure 4:
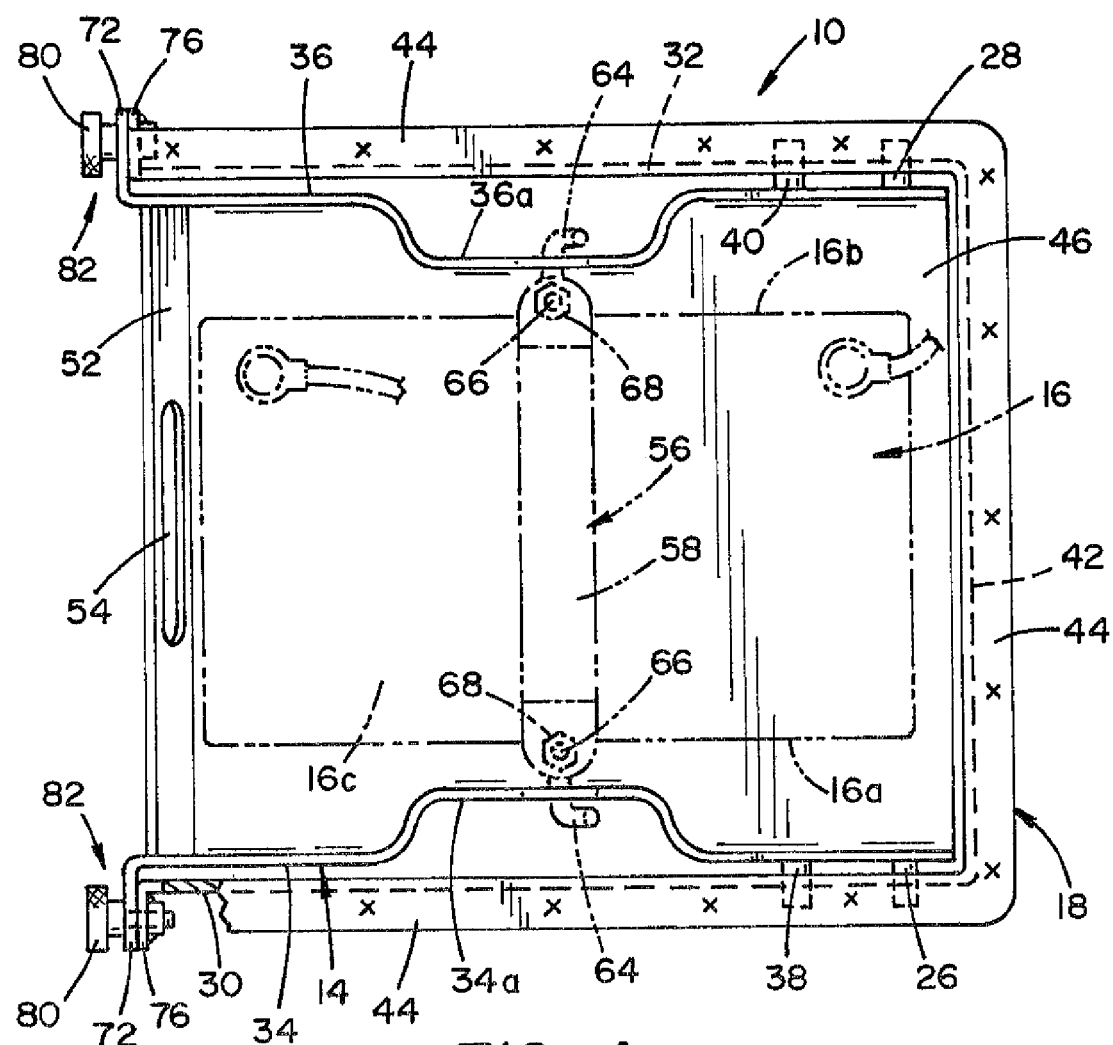
Figure 5:
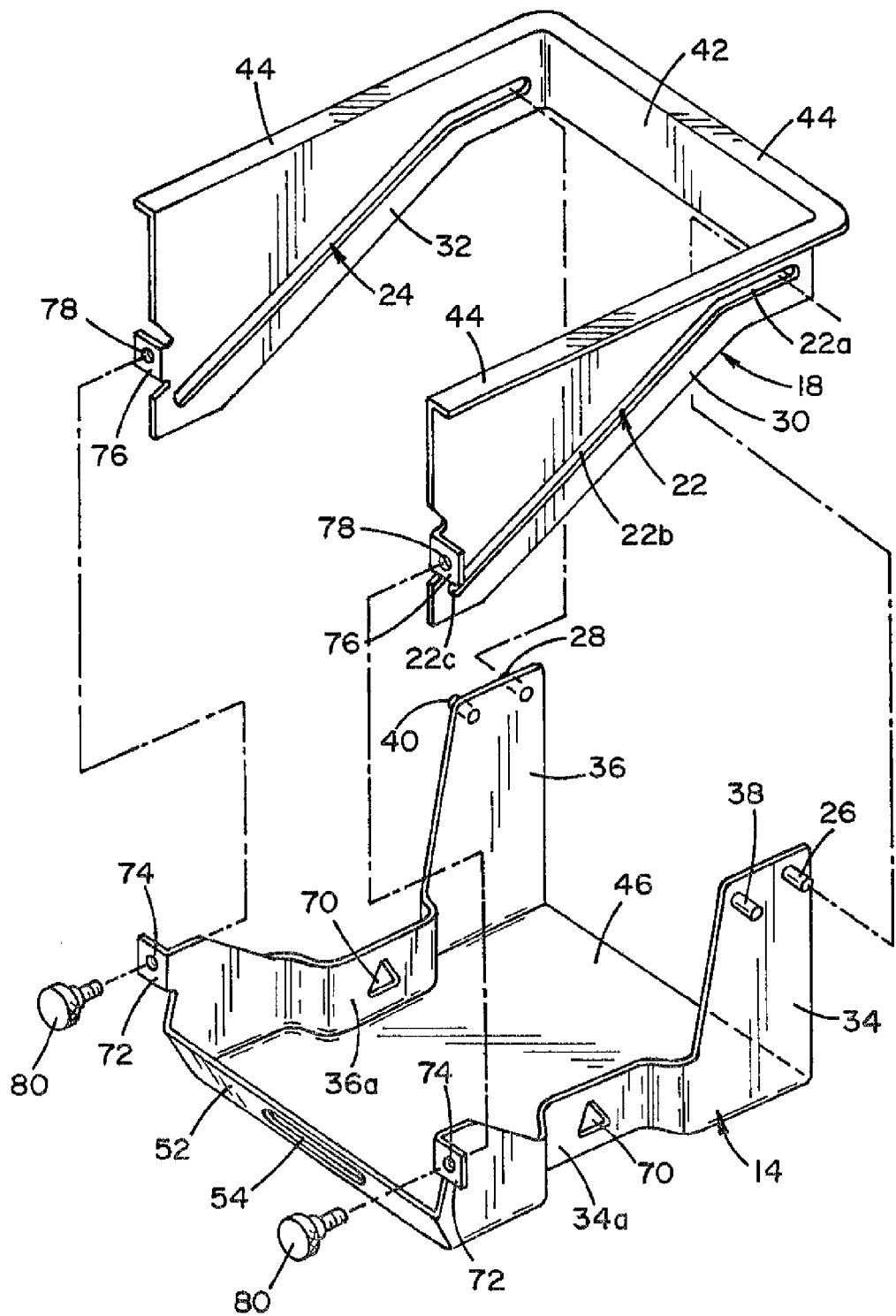

The sidewalls 34, 36 of the battery tray 14 can function to limit side-to-side movement of the battery 16 relative to the battery tray 14. In the illustrated embodiment, the sidewalls 34, 36 respectively include indented portions 34a, 36a that are spaced closely adjacent longitudinal sides 16a, 16b of the battery 16 (see FIG. 4). This arrangement provides limited space for side-to-side movement of the battery 16 on the battery tray 14. The battery tray 14 can also include a forward or front wall 52, which can also function to limit forward lateral movement of the battery 16 relative to the battery tray 14 (i.e., lateral relative to a direction of travel of the vehicle 12), particularly when the battery tray 14 is in the first operational position. As shown in the illustrated embodiment, the forward wall can define a recess or aperture 54 to facilitate gripping of the battery tray 14 when desirable to move the battery tray 14 to either the first operational position or the second maintenance position.

A battery hold-down assembly 56 can also be employed to secure the battery 16 to the battery tray 14. In the illustrated embodiment, the hold-down assembly 56 includes a cross-bar 58 extending across a top side 16c of the battery 16. The cross-bar 58 includes apertures 60 (FIG. 2) at opposite ends thereof through which threaded hold-down fasteners 62 are received. Lower ends of the hold-down fasteners 62 are formed as hook ends 64, which can be received through triangular-shaped apertures 70 defined in the indented portions 34a, 36a of the sidewalls 34, 36 of the battery tray 14. Opposite ends 66 of the hold-down fasteners 62 are threaded for cooperative engagement with a threaded member, such as nuts 68. By this arrangement, the battery 16 can be secured to the battery tray 14, but is removable therefrom when in the second maintenance position simply by unthreading the nuts 68 from the threaded ends 66 of the fasteners 62, which allows removal of the cross-bar 58.

Figure 3:
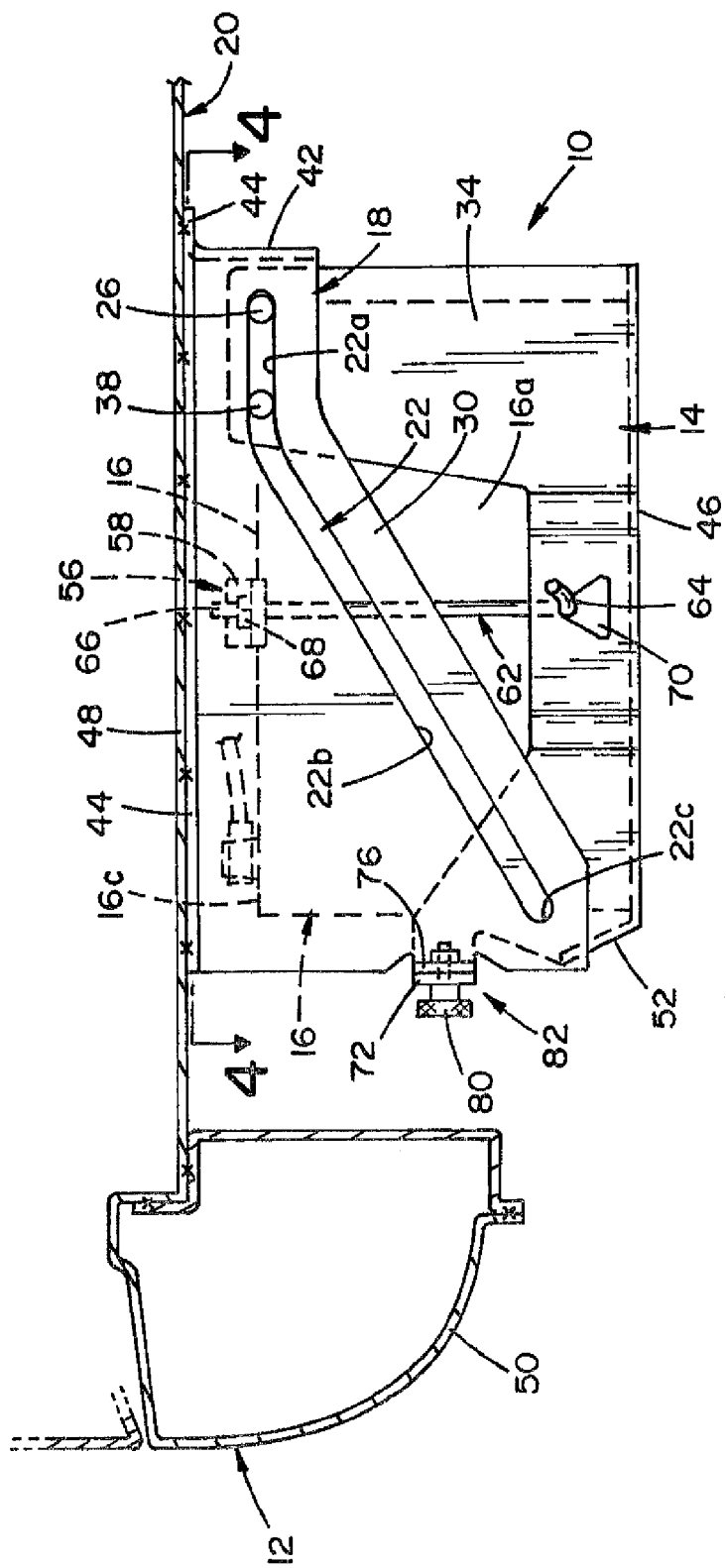

In addition to the walls 34, 36, 52 of the battery tray 14 limiting movement of the battery 16, the rear wall 42 of the support structure 18 limits rearward movement of the battery 16 relative to the battery tray 14 when the battery tray 14 is in the first operative position (see FIG. 3). In particular, the battery 16 is prevented from being removed by at least one of the support structure 18 and the battery tray 14 when the battery tray 14 is in the first position; however, the battery 16 is removable from the battery tray 14 and the support structure 18 when the battery tray 14 is in the second maintenance position. In particular, the sidewalls 34, 36 of the battery tray 14 and the sidewalls 30, 32 of the support structure 18 in combination with the rearward wall 42 of the support structure 18 and the forward wall 52 of the battery tray 14 prevent removal of the battery 16 when the battery tray 14 is in the first operational position.

The battery mounting assembly 10 can further include a locking structure for locking the battery tray 14 in the first operational position of FIG. 3. In the illustrated embodiment, first and second pairs of locking structures are provided on opposite sides of the mounting assembly 10, though this is not required. Each pair of locking structures includes a portion 72 of the battery tray 14 defining a battery tray locking aperture 74 and a portion 76 of the support structure 18 defining a support structure locking aperture 78. More particularly, in the illustrated embodiment, the portion 72 of the battery tray 14 of the first pair of locking structures is a flange extending from the sidewall 34 and the portion 76 of the support structure 18 of the first pair of locking structures is a flange extending from the sidewall 30. The portion 72 of the battery tray 14 of the second pair of locking structures is a flange extending from the sidewall 36 and the portion 76 of the support structure 18 of the second pair of locking structures is a flange extending from the sidewall 32. When the battery tray 14 is in the first operational position, the apertures 74 and 78 of each of the pairs of locking structures are positioned so as to be in registry with one another for receipt of a threaded locking member 80. Collectively, the portions 72, 76 of each pair of locking structures defining the apertures 74, 78 together with the threaded locking member 80, form a locking device 82 for the battery mounting assembly 10 that selectively locks the battery tray 14 in the first operational position (as shown in FIG. 3).

In the illustrated embodiment, the locking device 82 is provided on both sides of the battery mounting assembly 10 (i.e., first and second pairs of locking structures are provided) such that flange portions 72 extend from both sidewalls 34, 36 of the battery tray defining apertures 74 therein and flange portions 76 extend from both sidewalls 30, 32 of the support structure 18 for receipt of respective threaded locking members 80. In the illustrated embodiment, the apertures 78 of the support structure flange portions 76 can be threaded for threaded engagement with the threaded locking members 80, though other arrangements could be used (e.g., a bayonet-style fastener).

In operation, with the support structure 18 mounted to the underside 20 of the vehicle 12 and the battery tray 14 movably secured to the support structure 18, the battery tray 14 is movable from the first operational position wherein the battery tray 14 is positioned adjacent the underside 20 of the vehicle 12 to a second maintenance position wherein the battery tray 14 is positioned laterally away and below the underside 20 relative to the first position. In particular, to move the battery tray 14 from the first operational position to the second maintenance position, the threaded locking members 80 are unthreaded from the flanges 76 of the support structure 18. This allows the battery tray 14 to be slidably moved relative to the support structure 18.

Figure 2:
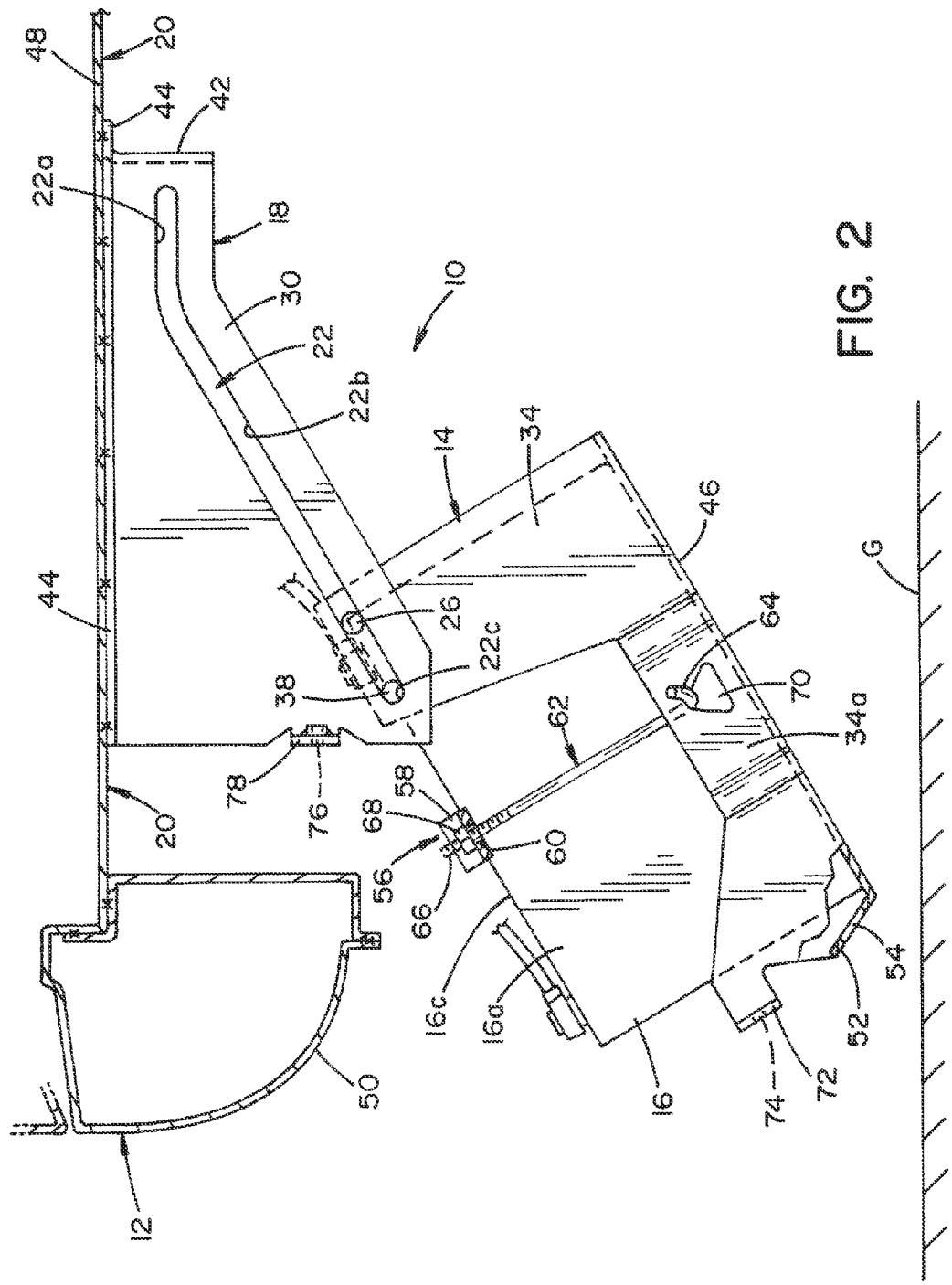

In particular, with the threaded locking members 80 unthreaded from the flanges 76, the guide pins 26, 38 and 28, 40 can be slid along their respective slots 22, 24 to guide the battery tray 14 from the first operational position of FIG. 3 to the second maintenance position of FIGS. 1 and 2. In the second maintenance position, the battery 16 can be accessed (e.g., for testing) and/or can be removed from the battery tray 14, such as would occur during replacement of the battery 16. Of course, when employed, the battery hold-down assembly 56 would also need to be removed while the tray 14 is in the second maintenance position to remove the battery 16.

When maintenance on the battery 16 is complete (i.e., testing of the battery is finished or replacement of the battery occurs), the battery tray 14 can be moved slidably along the support structure 18 from the second maintenance position to the first operational position. Again, the guide pins 26, 28 and 38, 40 can slide along the respective slots 22, 24 for guiding slidable movement of the battery tray 14 relative to the support structure 18. As the guide pins 26, 28 and 38, 40 move from the sloped sections (e.g., section 22b of slot 22) to the relatively flat sections of the slots 22, 24 (e.g., slot section 22a), the battery tray 14 is guided into position such that the lower wall 46 and the battery 16 carried thereon are again positioned approximately parallel to ground and to the underside 20 of the vehicle 12. In the first position, the apertures 74, 78 are again aligned such that the threaded members 80 can be received therethrough to lock the battery tray 14 in the first position.

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A battery mounting assembly for a vehicle, comprising:
 a battery tray configured to carry an associated vehicle battery; and
 a battery tray support structure mounted to an underside of the vehicle, said battery tray slidably mounted to said battery tray support structure for movement between a first operational position and a second maintenance position, the second maintenance position laterally spaced apart from and below said first operational position, wherein said battery tray includes a forward wall limiting forward movement of the associated battery relative to said battery tray and said battery tray is open at a rear thereof, and wherein said support structure includes a rear wall limiting rearward movement of the associated battery relative to said battery tray when said battery tray is in said first operative position.

2. The battery mounting assembly of claim 1 further including:
 at least one track disposed on said support structure and spaced vertically below the underside of the vehicle; and
 at least one guide element disposed on said battery tray, said at least one guide element movable along said at least one track for guiding movement of said battery tray as said battery tray is moved between said first operative position and said second maintenance position.

3. The battery mounting assembly of claim 2 wherein said at least one track includes at least one slot defined in said support structure and said at least one guide element includes at least one guide pin received in said at least one slot.

4. The battery mounting assembly of claim 3 wherein said at least one slot includes a first slot defined in a first sidewall of said support structure and a second slot defined in a second, opposite sidewall of said support structure, and wherein said at least one guide pin includes a first guide pin disposed on a first sidewall of said battery tray and received in said first slot and a second guide pin disposed on a second, opposite sidewall of said battery tray and received in said second slot.

5. The battery mounting assembly of claim 3 wherein said at least one slot includes a first slot defined in a sidewall of said support structure and said at least one guide pin includes a pair of spaced apart guide pins received in said first slot.

6. The battery mounting assembly of claim 2 wherein said at least one track includes a relatively flat section and a sloped section, said at least one guide element located in said relatively flat section when said battery tray is in said first operational position and spaced apart from said relatively flat section when said battery tray is in said second maintenance position.

7. The battery mounting assembly of 6 wherein said at least one guide element includes a pair of spaced apart guide elements disposed on one side of said battery tray, said pair of spaced apart guide pins both received in said relatively flat section to orient a base wall of said battery tray in generally parallel relation with at least one of ground and an underside of the vehicle.

8. The battery mounting assembly of claim 1 further including a locking structure for locking said battery tray in said first operational position.

9. The battery mounting assembly of claim 8 wherein said locking structure includes a portion of said battery tray defining a battery tray locking aperture and a portion of said support structure defining a support structure locking aperture, said apertures in registry with one another when said battery tray is in said first operational position for receipt of a threaded locking member.

10. The battery mounting assembly of claim 1 wherein said battery tray includes a first sidewall and a second opposite sidewall, and wherein both sidewalls limit side-to-side movement of the associated vehicle battery relative to said battery tray.

11. The battery mounting assembly of claim 1 wherein said support structure includes a mounting flange defined along an upper portion thereof for mounting of said support structure to said underside of the vehicle.

12. A battery mounting assembly for a vehicle battery, comprising:
 a support structure for carrying the vehicle battery, wherein said support structure is mounted to an underside of an associated vehicle;
 a battery tray having a front wall and being open at a rear thereof, said battery tray slidably mounted to said support structure such that said battery tray is movable between a first position and a second position, said second position being laterally spaced apart from and below said first position, and wherein said support structure includes a rear wall limiting rearward lateral movement of the vehicle battery when said battery tray is in said first position and said battery tray includes a front wall limiting forward lateral movement of the vehicle battery when said battery tray is in said first position.

13. The battery mounting assembly of claim 12 wherein the vehicle battery is prevented from being removed by at least one of said support structure and said battery tray when said battery tray is in said first position and the vehicle battery is removable from said battery tray and said support structure when said battery tray is in said second position.

14. The battery mounting assembly of claim 12 wherein said support structure includes a pair of opposed sidewalls between which said battery tray is positioned when in said first position, said sidewalls including guide slots defined therethrough in which guide pins of said battery tray are received for guiding movement of said battery tray between said first and second positions.

15. The battery mounting assembly of claim 14 wherein said guide pins include two spaced apart guide pins disposed on one side of said battery tray and received in a slot on a first sidewall of said pair of opposed sidewalls and two spaced apart guide pins disposed on another, opposite side of said battery tray and received in a slot on a second sidewall of said pair of opposed sidewalls.

16. The battery mounting assembly of claim 14 wherein said guide slots each include a relatively flat section disposed adjacent a rear side of said support structure and an angled section extending from said flat section away from said rear side.

17. A vehicle battery mounting assembly, comprising:
a support structure mounted to an underside of a vehicle; and
a battery tray slidably mounted to said support structure, said battery tray movable from a first position wherein said battery tray is positioned adjacent said underside to a second position wherein said battery tray is positioned laterally away from said first position and below said underside, wherein said battery tray includes a forward wall limiting forward movement of an associated battery relative to said battery tray and said battery tray is open at a rear thereof, and wherein said support structure includes a rear wall limiting rearward movement of the associated battery relative to said battery tray when said battery tray is in said first operative position.

18. The battery mounting assembly of claim 6 wherein said at least one track is fully closed at a forward end and a rearward end to prevent said at least one guide pin from egressing from said at least one track.

* * * * *